May 26, 1925. 1,539,340
A. W. SIZER
MACHINE FOR COMPRESSING OR MOLDING PLASTIC SUBSTANCES
Filed Oct. 29, 1924 2 Sheets-Sheet 2
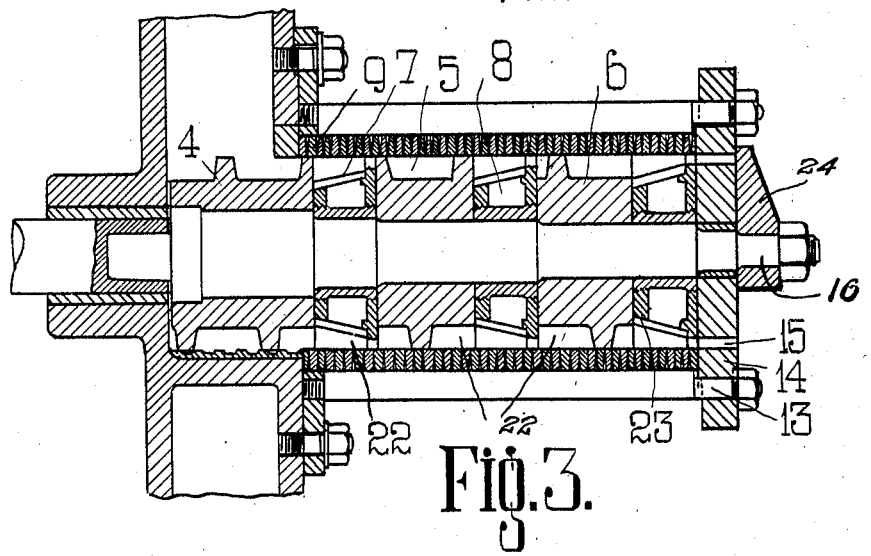
Fig.3.
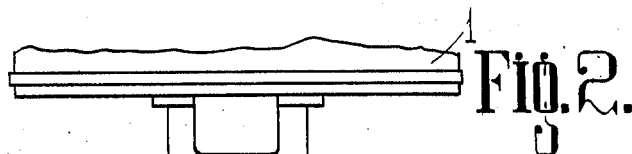
Fig.2.
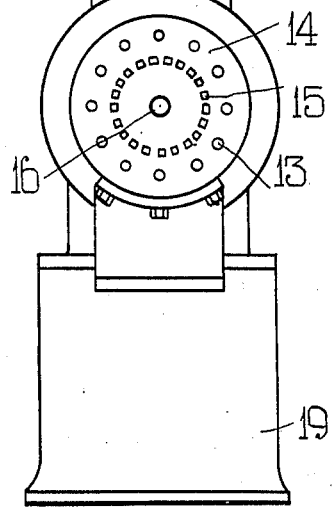
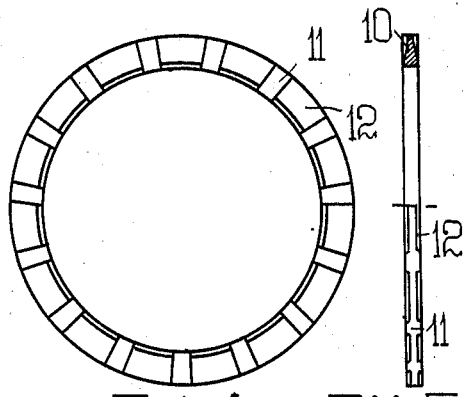
Fig.4. Fig.5.
Inventor
Albert William Sizer
By Sturtevant & Mason
Attorneys Patented May 26, 1925.

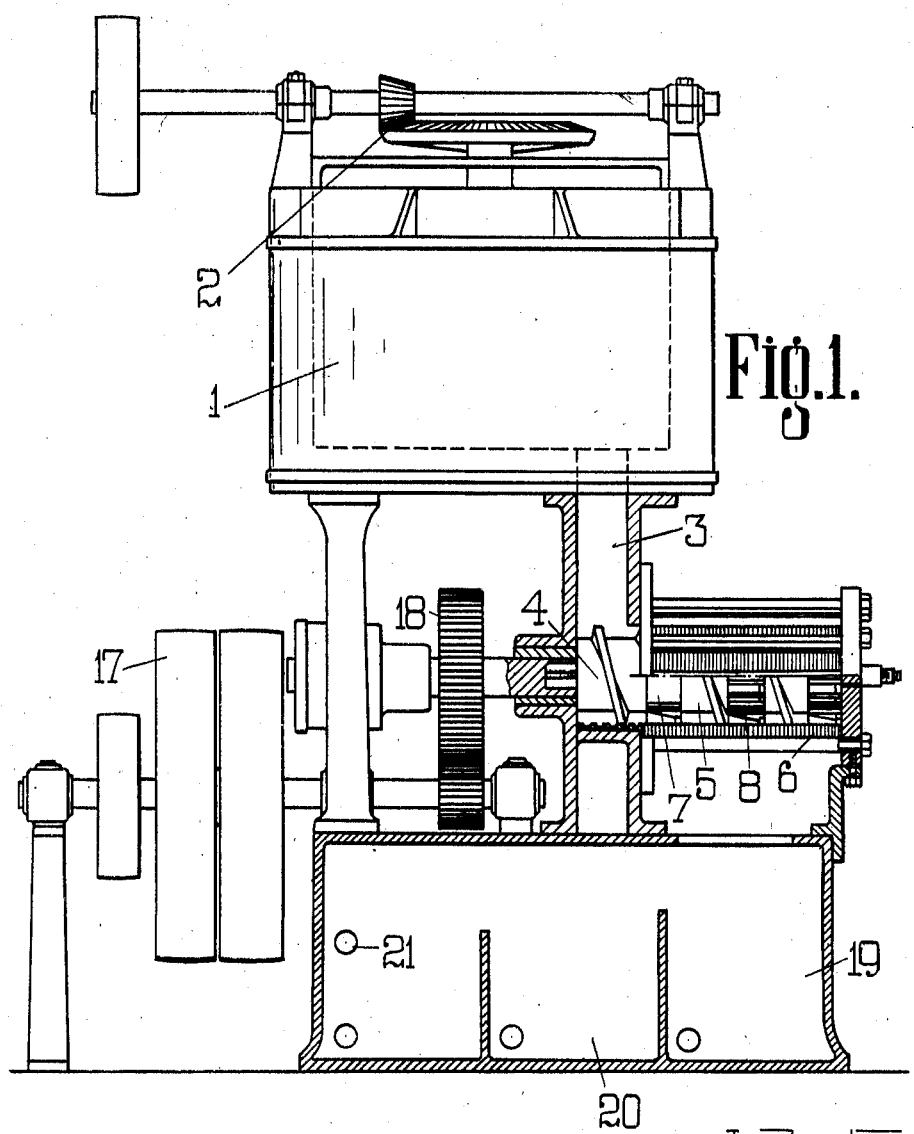

1,539,340

UNITED STATES PATENT OFFICE.

ALBERT WILLIAM SIZER, OF HESSLE, ENGLAND.

MACHINE FOR COMPRESSING OR MOLDING PLASTIC SUBSTANCES.

Application filed October 29, 1924. Serial No. 746,622.

*To all whom it may concern:*

Be it known that I, ALBERT WILLIAM SIZER, a subject of the King of Great Britain, residing at Hessle, in the county of York and Kingdom of England, have invented certain new and useful Improvements in Machines for Compressing or Molding Plastic Substances, of which the following is a specification.

The present invention relates to improvements in compressing and molding machines more particularly of the type suitable for the treatment of oil bearing seed and the like material in which the residue solid material is obtained in the form of cake by which it can be easily handled.

Where oil is expressed from cotton seed or the like it has been usual to use the cake for the feeding of cattle.

According to the present invention meal is forced by means of a consecutive screw conveyor sections through a number of die-plates spaced along and within a compression chamber provided with ducts for the escape of liquor throughout its length.

The present invention is more particularly described with reference to the accompanying drawings, in which:

Figure 1 is an elevation partly in section of an arrangement according to the present invention.

Figure 2 is a corresponding partial front elevation.

Figure 3 is a sectional elevation of the oil expressing part of the machine.

Figure 4 is a front elevation of one of the laminæ of the chamber.

Figure 5 is a corresponding side view partly in section.

Meal or the like material from which it is desired to express oil or liquor is fed from a hopper 1 in which it receives the usual cooking or other treatment by means of stirring gear 2 through an opening 3 to feed worm section 4 which forces the meal axially along the chamber 9 and through the tapered passages and ports 22 in a die plate 7, the extruded material from which is taken up by the feed worm section 5 forced along the chamber 9 and through the next ported die plate 8 from which it is again taken up by a feed worm section 6 and forced through another die plate 23 and then through the final die plate 14. The die plates 8 and 23 are each formed with tapered passages and ports 22. These passages and ports are located at the periphery of the die plates and are open at the outer face. The die plate makes contact with the inner face of the compression chamber and, therefore, the wall of the chamber forms the outer walls of the tapered ports. The material is fed by the screws into these ports where it is compressed and owing to the forming of the wall of the compression chamber with ducts throughout the entire length thereof, there is a free flow of the liquor through the ducts while the material is being forced through the ports. By having a series of die plates and a series of feed screw sections the pressure on the material is distributed throughout the length of the compression chamber. The chamber 9 is built up of a number of plates. The walls of these plates taper outwards as shown at 10 (Figure 5) and are very finely spaced apart from one another, which can be effected for instance, by forming the meeting edges of the plates truly flat as at 11 and then milling away or grinding certain portions only around the surface of the plate as at 12 so that upstanding projections 11 are left with liquor ducts in between.

The plates of the chamber 9 are held in position by a number of bolts 13 spaced around them which hold up the final die-plate 14 having passages 15 within it through which the meal, freed of its oil bearing content, is forced, to form bars, from which short cakes can be cut off, by means of a rotating blade or knife 24, mounted on the extension of the driving spindle 16 of the worm conveyor. This spindle 16 is driven from the driving pulley 17 by gearing 18 of any desired form.

The oil passing through the spaces or ducts 12 between adjacent plates passes into settling tanks, 19, 20 and can be finally drawn off by a pipe 21.

The plates of the chamber 9 are preferably of different thicknesses or again the number of oil conveying slots in them may be differentially disposed so that a greater area for the escaping oil is provided along those portions of the surface of the chamber enclosing the die-plate 7 where the oil will be escaping more freely than in that portion around the die plate 23 where the oil will be escaping less freely.

The die-plates 7, 8 and 23 will therefore, present the appearance of fluted or castellated rings, the grooves in which taper from one of the end faces to the other. This ring will normally be keyed into the cylinder 9 to prevent its rotation.

The die-plates 7, 8 and 23 have been shown to be hollow, but it is obvious that if desired they may be solid, in which case the whole of the oil extruded from the meal during its passage through the machine will pass through the interstices in the plates 5.

The cylindrical chamber has been described as composed of a large number of annular plates. It is obvious that this die-cylinder may be equally well built up of longitudinal bars or staves presenting narrow slots or interstices at their contacting surfaces.

I declare that what I claim is:—

1. A machine for expressing liquor from material comprising a compression chamber having ducts throughout its entire length for the escape of the liquor, a plurality of spaced stationary die plates located within said chamber and engaging the inner surface of said chamber, each of said die plates having a plurality of tapered ports or passages at the periphery thereof, and a worm section associated with each die plate and located between adjacent die plates for forcing the material through the tapered passages in said die plates in succession, whereby the pressure on the material is distributed throughout the length of the compression chamber.

2. A machine for expressing liquor from material comprising a compression chamber having ducts throughout its entire length for the escape of the liquor, a plurality of spaced stationary die plates located within said chamber and engaging the inner surface of said chamber, each of said die plates having a plurality of tapered ports or passages at the periphery thereof, and a worm section associated with each die plate and located between adjacent die plates for forcing the material through the tapered passages in said die plates in succession, whereby the pressure on the material is distributed throughout the length of the compression chamber, said tapered ports at the periphery of the die plates being open at the outer face of the die plate, so that a free flow of the liquor through the ducts in the compression chamber is obtained while the material is being forced through the die plates.

In witness whereof, I have hereunto signed my name this 16th day of October 1924, in the presence of two subscribing witnesses.

ALBERT WILLIAM SIZER.

Witnesses:
 WILLIAM THOMAS ASKWITH,
 RUPERT HENRY BRADFIELD.